US012684430B2

(12) United States Patent
Takahashi et al.

(10) Patent No.: US 12,684,430 B2
(45) Date of Patent: Jul. 14, 2026

(54) USER EQUIPMENT, BASE STATION, AND CELL RESELECTION METHOD

(71) Applicants: DENSO CORPORATION, Kariya-city (JP); TOYOTA JIDOSHA KABUSHIKI KAISHA, Toyota (JP)

(72) Inventors: Hideaki Takahashi, Kariya-city (JP); Haruhiko Sogabe, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 18/493,534

(22) Filed: Oct. 24, 2023

(65) Prior Publication Data

US 2024/0056914 A1     Feb. 15, 2024

Related U.S. Application Data

(63) Continuation of application No. PCT/JP2022/017999, filed on Apr. 18, 2022.

(30) Foreign Application Priority Data

Apr. 28, 2021     (JP) ................................ 2021-075722

(51) Int. Cl.
 *H04W 36/00* (2009.01)
 *H04W 36/30* (2009.01)
(52) U.S. Cl.
 CPC ... *H04W 36/0072* (2013.01); *H04W 36/0061* (2013.01); *H04W 36/008355* (2023.05); *H04W 36/30* (2013.01)
(58) Field of Classification Search
 CPC ......... H04W 36/0072; H04W 36/0061; H04W 36/008355; H04W 36/30; H04W 8/22;
(Continued)

(56) References Cited

U.S. PATENT DOCUMENTS

2017/0013551 A1     1/2017  Martin
2019/0021049 A1     1/2019  Martin
(Continued)

FOREIGN PATENT DOCUMENTS

EP           3488646 B1      4/2021
WO      WO-2022188717 A1 *  9/2022   .............. H04W 4/12

OTHER PUBLICATIONS

Fujitsu, "Cell Reselection of RedCap UE", Document R2-2100755, 3GPP TSG-RAN WG2 Meeting #113e, Jan. 25-Feb. 5, 2021.
(Continued)

*Primary Examiner* — Mohamed A Kamara
(74) *Attorney, Agent, or Firm* — Harness, Dickey & Pierce, P.L.C.

(57) ABSTRACT

A base station used broadcasts system information in a cell, the system information being used to allow a user equipment existing in the cell of the base station to perform cell reselection using a neighboring cell different from the cell as a candidate. The base station is configured to broadcast the system information including a second neighboring cell list different from a first neighboring cell list for a general user equipment as a neighboring cell list indicating the neighboring cell to be excluded from the candidate or the neighboring cell to be selected as the candidate. The second neighboring cell list is the neighboring cell list for a specific user equipment having a lower communication capability than a communication capability of the general user equipment.

6 Claims, 8 Drawing Sheets

(58) Field of Classification Search
    CPC ..... H04W 48/20; H04W 48/12; H04W 48/16;
                                         Y02D 30/70
    See application file for complete search history.

(56)                 References Cited

U.S. PATENT DOCUMENTS

| | | | |
|---|---|---|---|
| 2021/0045054 A1 | 2/2021 | Liu et al. | |
| 2023/0033231 A1* | 2/2023 | Zuo ........................ | H04W 48/10 |
| 2023/0156583 A1* | 5/2023 | Murray ................. | H04W 48/20 |
| | | | 370/329 |

OTHER PUBLICATIONS

Samsung Electronics, "Change Request: UE Behavior on Cell Reselection if range ToBestCell is configured_Option 1", Document R2-1905163, 3GPP TSG-RAN2 WG2 Meeting #105bis, Apr. 8-12, 2019.

3GPP TS 38.331 V16.4.1 (Mar. 2021), 3rd Generation Partnership Project; Technical Specification Group Radio Access Network; NR; Radio Resource Control (RRC) protocol specification (Release 16), pp. 1-949.
TR 38.875 v17.0.0: Study on support of reduced capability NR devices, pp. 1-135, Mar. 2021.
RP-210918 "Revised WID on support of reduced capability NR devices," Nokia, Ericsson, pp. 1-6, Mar. 22-26, 2021.
R2-2102947 Camping restriction and cell selection criterion, Denso Corporation, pp. 1-3, Apr. 12-20, 2021.
R2-2100311, "Impact of reduced capabilities on upper-layer procedures," Qualcomm Incorporated, pp. 1-4, Jan. 25-Feb. 5, 2021.
3GPP TS 38.304 V16.4.0, 3rd Generation Partnership Project; Technical Specification Group Radio Access Network; NR; User Equipment (UE) procedures in Idle mode and RRC Inactive state (Release 16), pp. 1-39, Mar. 2021.
3GPP TS 36.331V16.4.0, 3rd Generation Partnership Project; Technical Specification Group Radio Access Network; Evolved Universal Terrestrial Radio Access (E-UTRA); Radio Resource Control (RRC); Protocol specification (Release 16), pp. 1-1087, Mar. 2021.

* cited by examiner

110 COMMUNICATION UNIT

111 RECEIVER

112 TRANSMITTER

120 CONTROLLER

FIG. 7

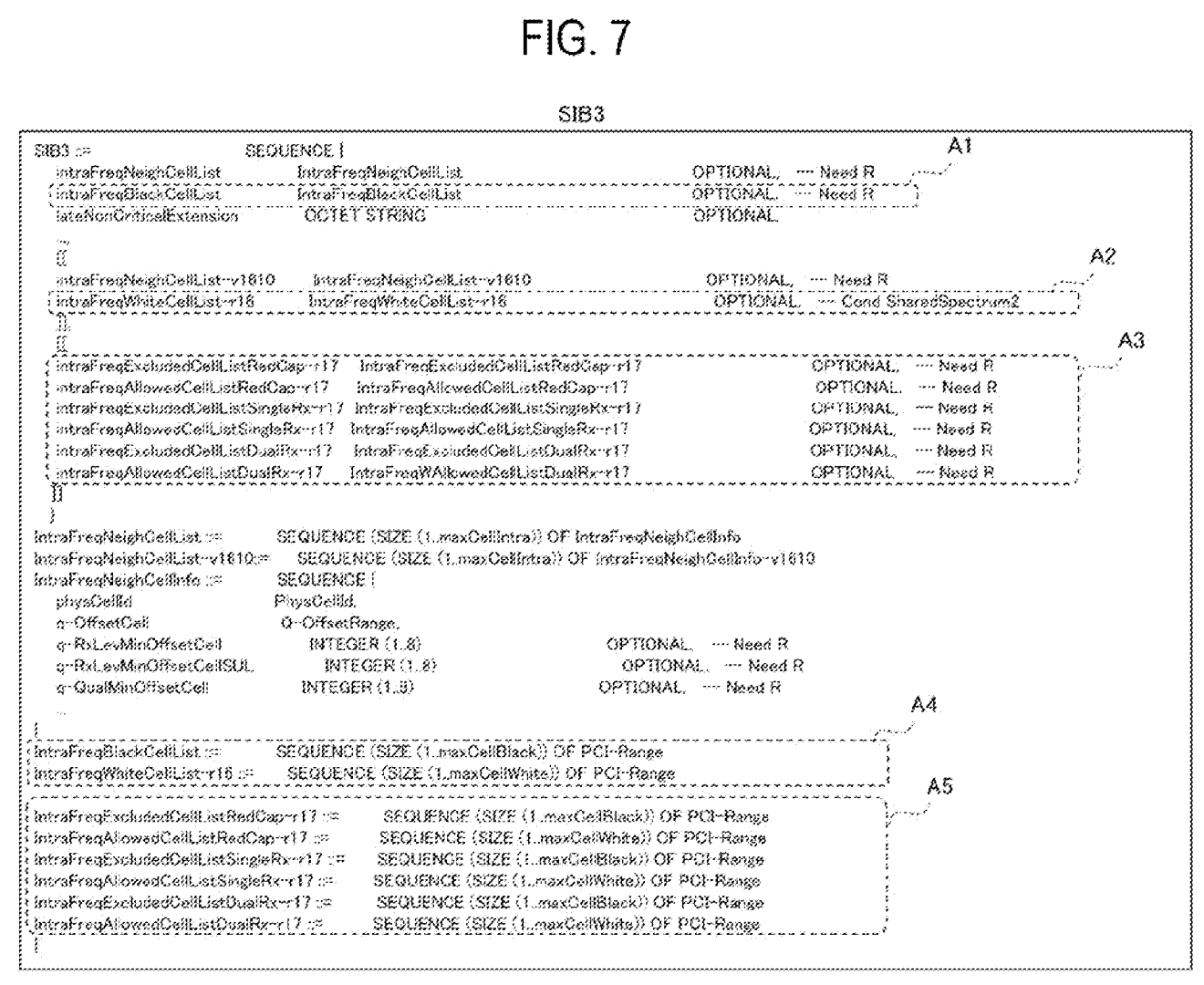

```
SIB3

SIB3 ::=                          SEQUENCE {
    intraFreqNeighCellList            IntraFreqNeighCellList                                   OPTIONAL,    -- Need R       A1
    intraFreqBlackCellList            IntraFreqBlackCellList                                   OPTIONAL,    -- Need R
    lateNonCriticalExtension          OCTET STRING                                             OPTIONAL,

[[
    intraFreqNeighCellList-v1610      IntraFreqNeighCellList-v1610                             OPTIONAL,    -- Need R       A2
    intraFreqWhiteCellList-v16        IntraFreqWhiteCellList-v16                               OPTIONAL,    -- Cond SharedSpectrum2
    ]]

[[
    intraFreqExcludedCellList-v1610   IntraFreqExcludedCellListRedCap-r17   OPTIONAL,    -- Need R       A3
    intraFreqExcludedCellListRedCap-r17                                     OPTIONAL,    -- Need R
    intraFreqAllowedCellListRedCap-r17                                      OPTIONAL,    -- Need R
    intraFreqExcludedCellListSingleRx-r17                                   OPTIONAL,    -- Need R
    intraFreqAllowedCellListSingleRx-r17                                    OPTIONAL,    -- Need R
    intraFreqExcludedCellListDualRx-r17                                     OPTIONAL,    -- Need R
    intraFreqAllowedCellListDualRx-r17                                      OPTIONAL,    -- Need R
    ]]
}

IntraFreqNeighCellList ::=        SEQUENCE (SIZE (1..maxCellIntra)) OF IntraFreqNeighCellInfo
IntraFreqNeighCellList-v1610 ::=  SEQUENCE (SIZE (1..maxCellIntra)) OF IntraFreqNeighCellInfo-v1610
IntraFreqNeighCellInfo ::=        SEQUENCE {
    physCellId                        PhysCellId
    q-OffsetCell                      Q-OffsetRange
    q-RxLevMinOffsetCell              INTEGER (1..8)                                           OPTIONAL,    -- Need R       A4
    q-RxLevMinOffsetCellSUL           INTEGER (1..8)                                           OPTIONAL,    -- Need R
    q-QualMinOffsetCell               INTEGER (1..8)                                           OPTIONAL,    -- Need R
}

IntraFreqBlackCellList ::=        SEQUENCE (SIZE (1..maxCellBlack)) OF PCI-Range              A5
IntraFreqWhiteCellList-v16 ::=    SEQUENCE (SIZE (1..maxCellWhite)) OF PCI-Range
IntraFreqExcludedCellListRedCap-r17 ::=   SEQUENCE (SIZE (1..maxCellBlack)) OF PCI-Range
IntraFreqAllowedCellListRedCap-r17 ::=    SEQUENCE (SIZE (1..maxCellWhite)) OF PCI-Range
IntraFreqExcludedCellListSingleRx-r17 ::= SEQUENCE (SIZE (1..maxCellBlack)) OF PCI-Range
IntraFreqAllowedCellListSingleRx-r17 ::=  SEQUENCE (SIZE (1..maxCellWhite)) OF PCI-Range
IntraFreqExcludedCellListDualRx-r17 ::=   SEQUENCE (SIZE (1..maxCellBlack)) OF PCI-Range
IntraFreqAllowedCellListDualRx-r17 ::=    SEQUENCE (SIZE (1..maxCellWhite)) OF PCI-Range
```

FIG. 8

SIB4

USER EQUIPMENT, BASE STATION, AND CELL RESELECTION METHOD

CROSS-REFERENCE TO RELATED APPLICATIONS

The present application is a continuation application of international Patent Application No. PCT/JP2022/017999, filed on Apr. 18, 2022, which designated the U.S., and claims the benefit of priority of Japanese Patent Application No. 2021-075722, filed on Apr. 28, 2021, the entire contents of which are incorporated herein by reference.

TECHNICAL FIELD

The present disclosure relates to a user equipment used in a mobile communication system, a base station, and a cell reselection method.

BACKGROUND ART

In recent years, in the 3rd generation partnership project (3GPP) (registered trademark, the same applies hereinafter), which is a standardization project of a mobile communication system, it has been studied to provide a specific user equipment having a lower communication capability than that of a general user equipment in a 5G system (refer to Non Patent Literatures 1 and 2). The specific user equipment is a user equipment having performance and price in a middle range for Internet of Things (IoT). In the specific user equipment, for example, the maximum bandwidth used for radio communication is configured narrower or the number of receivers is smaller than that in the general user equipment. It is noted that the receiver may also be referred to as a reception branch.

Since the specific user equipment has a feature that the general user equipment does not have, a cell capable of supporting the specific user equipment can be limited. In view of such circumstances, there is provided a technology for notifying whether to allow access from the specific user equipment using a system information type 1 (SIB1) broadcasted by a cell (refer to Non Patent Literature 3). According to such a technology, the specific user equipment in the RRC idle state or the RRC inactive state can be prevented from selecting, in cell reselection, a cell that broadcasts the SIB1 indicating that access from the specific user equipment is not allowed.

CITATION LIST

Non Patent Literature

Non Patent Literature 1: 3GPP Contribution RP-210918 "Revised WID on support of reduced capability NR devices"
Non Patent Literature 2: 3GPP Technical Report TR 38.875 v17.0.0 "Study on support of reduced capability NR devices"
Non Patent Literature 3: 3GPP Contribution R2-2102947 "Camping restriction and cell selection criterion"

SUMMARY OF INVENTION

In the technology described in Non Patent Literature 3, the specific user equipment can recognize allowance and non-allowance of access to a cell only after performing measurement processing or the like on the detected cell and acquiring and decoding system information (SIB1) of the cell. However, in a case where the system information indicates that access to the cell is not allowed, the specific user equipment needs to search for another cell again, and processing (particularly, measurement processing) performed to decode the system information is consequently wasted. From this circumstance, the inventor has found a problem that inefficient cell reselection that unnecessarily consumes power may be performed.

Therefore, an object of the present disclosure is to provide a user equipment, a base station, and a cell reselection method capable of performing efficient cell reselection in a mobile communication system including a specific user equipment having a lower communication capability than that of a general user equipment.

In a first aspect, a user equipment used in a mobile communication system, the user equipment comprises: a communicator configured to receive, when the user equipment exists in a cell of a base station, system information broadcasted from the base station in the cell; and a controller configured to perform, based on the system information, cell reselection using a neighboring cell different from the cell as a candidate. The communicator is configured to receive the system information including a second neighboring cell list different from a first neighboring cell list for a general user equipment as a neighboring cell list indicating the neighboring cell to be excluded from the candidate or the neighboring cell to be selected as the candidate. The second neighboring cell list is the neighboring cell list for a specific user equipment having a lower communication capability than a communication capability of the general user equipment.

In a second aspect, a base station in a mobile communication system, the base station comprises a communicator configured to broadcast system information in a cell, the system information being used to allow a user equipment existing in the cell of the base station to perform cell reselection using a neighboring cell different from the cell as a candidate. The communicator is configured to broadcast the system information including a second neighboring cell list different from a first neighboring cell list for a general user equipment as a neighboring cell list indicating the neighboring cell to be excluded from the candidate or the neighboring cell to be selected as the candidate. The second neighboring cell list is the neighboring cell list for a specific user equipment having a lower communication capability than a communication capability of the general user equipment.

In a third aspect, a cell reselection method executed by a user equipment in a mobile communication system, the method comprises the steps of: receiving, when the user equipment exists in a cell of a base station, system information broadcasted from the base station in the cell; and performing, based on the system information, cell reselection using a neighboring cell different from the cell as a candidate. The step of receiving the system information includes a step of receiving the system information including a second neighboring cell list different from a first neighboring cell list for a general user equipment as a neighboring cell list indicating the neighboring cell to be excluded from the candidate or the neighboring cell to be selected as the candidate. The second neighboring cell list is the neighboring cell list for a specific user equipment having a lower communication capability than a communication capability of the general user equipment.

BRIEF DESCRIPTION OF DRAWINGS

The foregoing and other objects, features, and advantages of the present disclosure will become more apparent from the following detailed description with reference to the accompanying drawings. The drawings are as follows.

FIG. 2 is a diagram illustrating a configuration of a UE according to the embodiment.

FIG. 7 is a diagram illustrating an example of a first system information block according to the embodiment.

FIG. 8 is a diagram illustrating an example of a second system information block according to the embodiment.

DESCRIPTION OF EMBODIMENTS

Figure 1:
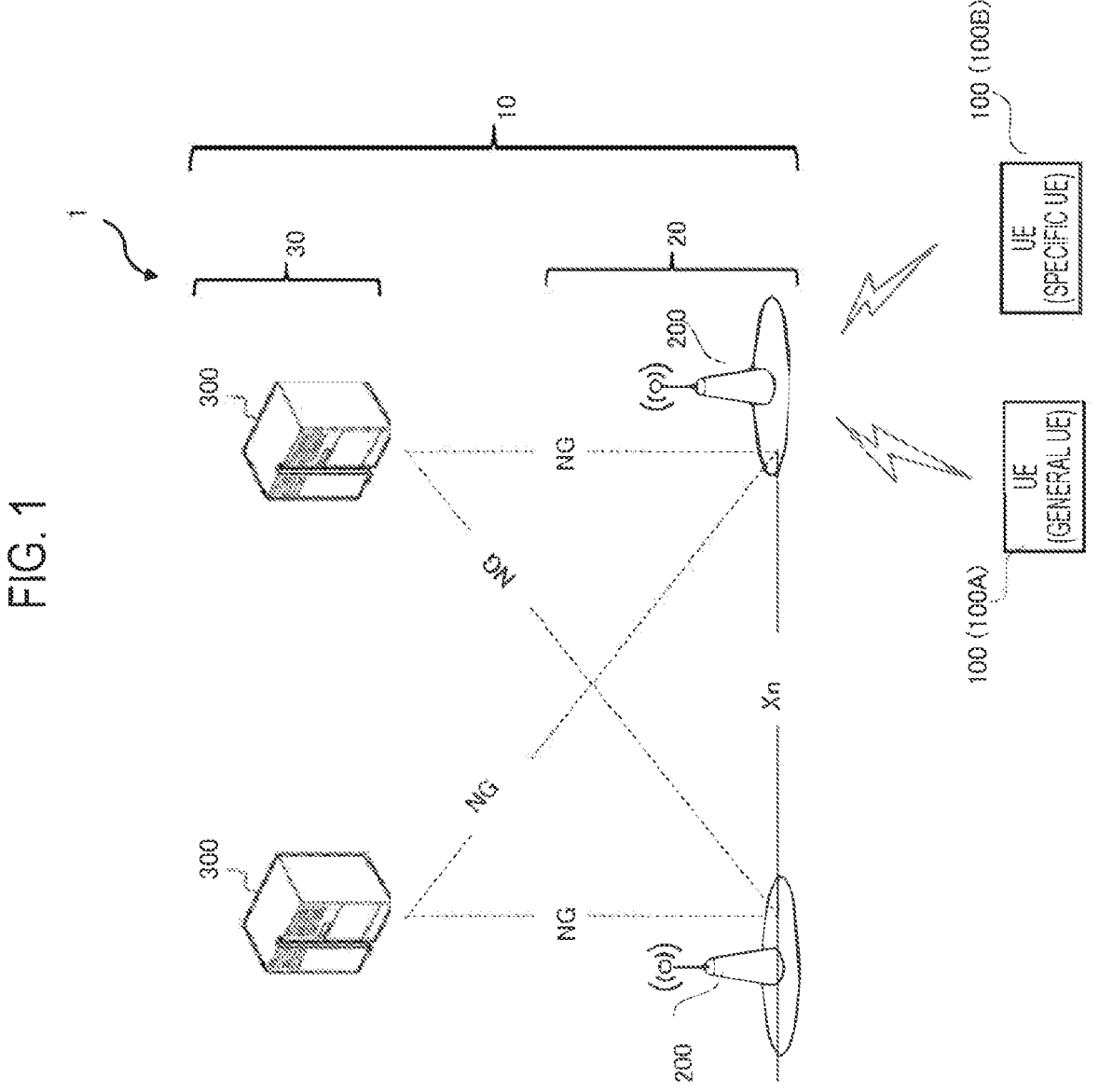
FIG. 1 is a diagram illustrating a configuration of a mobile communication system according to an embodiment.

With reference to the drawings, a mobile communication system according to an embodiment is described. In the description of the drawings, identical or similar parts are marked with identical or similar reference numerals.

(System Configuration)

First, a configuration of a mobile communication system 1 according to the present embodiment will be described with reference to FIG. 1. The mobile communication system 1 is, for example, a system conforming to a technical specification (TS) of 3GPP. Hereinafter, as the mobile communication system 1, a description will be given, as an example, as to a fifth generation system (5th generation system: 5GS) of the 3GPP standard, that is, a mobile communication system based on new radio (NR).

The mobile communication system 1 includes a network 10 and a user equipment (UE) 100 that communicates with the network 10. The network 10 includes a next generation radio access network (NG-RAN) 20, which is a 5G radio access network, and a 5G core network (5GC) 30, which is a 5G core network.

The UE 100 is an equipment used by a user. The UE 100 is, for example, a movable device such as a mobile phone terminal such as a smartphone, a tablet terminal, a notebook PC, a communication module, or a communication card. The UE 100 may be a vehicle (for example, a car, a train, or the like) or a device provided in the vehicle. The UE 100 may be a transport body other than a vehicle (for example, a ship, an airplane, or the like) or a device provided in the transport body. The UE 100 may be a sensor or a device provided in the sensor. It is noted that the UE 100 may be referred to as another name such as a mobile station, a mobile terminal, a mobile apparatus, a mobile unit, a subscriber station, a subscriber terminal, a subscriber apparatus, a subscriber unit, a wireless station, a wireless terminal, a wireless apparatus, a wireless unit, a remote station, a remote terminal, a remote apparatus, or a remote unit.

In the present embodiment, as the UE 100 of NR, two types of UE are assumed, that is, a general UE 100A and a specific UE 100B having a lower communication capability than that of the general UE 100A. The general UE 100A has an advanced communication capability such as a high speed and high capacity (enhanced mobile broadband: eMBB) and ultra-reliable low delay (ultra-reliable and low latency communications: URLLC), which are characteristics of NR. The specific UE 100B is a UE, the device cost and complexity of which are reduced as compared with the general UE 100A. The specific UE 100B is the UE 100 having the performance and price of a middle range for the IoT. For example, in the specific UE 100B, the maximum bandwidth used for radio communication is configured narrower or the number of receivers is smaller than that of the general UE 100A. It is noted that the receiver may be referred to as a reception branch. The specific UE may be referred to as a reduced capability NR device or a RedCap UE.

Specifically, the specific UE 100B may be able to communicate at a communication speed equal to or higher than a communication speed specified in a low power wide area (LPWA) standard, for example, long term evolution (LTE) Cat.1/1 bis, LTE Cat.M1 (LTE-M), and/or LTE Cat.NB1 (NB-IoT). The specific UE 100B may be able to communicate with a bandwidth equal to or larger than a bandwidth specified in the LPWA standard. The specific UE 100B may have a limited bandwidth used for communication as compared with the UE of Rel-15 or Rel-16. For example, regarding a frequency range 1 (FR1), the maximum bandwidth of the specific UE 100B may be 20 MHz. In addition, regarding a frequency range 2 (FR2), for example, the maximum bandwidth of the specific UE 100B may be 100 MHz. The specific UE 100B may have only one receiver that receives a radio signal. The specific UE 100B may be, for example, a wearable device, a sensor device, or the like.

The NG-RAN 20 includes a plurality of base stations 200. Each base station 200 manages at least one cell. A cell forms a minimum unit of a communication area. One cell belongs to one frequency (carrier frequency). The term "cell" may represent a radio communication resource, and may also represent a communication target of the UE 100. Each base station 200 can perform radio communication with the UE 100 existing in its own cell. The base station 200 communicates with the UE 100 by using a protocol stack of the RAN. Details of the protocol stack will be described later. The base station 200 provides NR user plane and control plane protocol terminations towards the UE 100 and is connected to the 5GC 30 via an NG interface. Such an NR base station 200 may be referred to as a gNodeB (gNB).

The 5GC 30 includes a core network apparatus 300. The core network apparatus 300 includes, for example, an access and mobility management function (AMF) and/or a user plane function (UPF). The AMF performs mobility management of the UE 100. The UPF provides a function specialized for U-plane processing. The AMF and the UPF are connected to the base station 200 via an NG interface.

In the mobile communication system 1 configured as described above, the cell (that is, the cell that supports the specific UE 100B) capable of supporting the specific UE 100B can be limited. Each cell may notify whether to allow access from the specific UE 100B with a system information type 1 (SIB1). The specific UE 100B does not select, in cell reselection, a cell that broadcasts the SIB1 indicating that the access from the specific UE 100B is not allowed.

Here, the specific UE 100B can recognize allowance/non-allowance of access to a cell only after performing measurement processing or the like on the detected cell and acquiring/decoding the system information (SIB1) of the cell. However, in a case where the system information indicates that the access to the cell is not allowed, the specific UE 100B needs to search for another cell again, and processing (particularly, measurement processing) performed to decode the system information is eventually wasted.

(Configuration of User Equipment)

Figure 2:
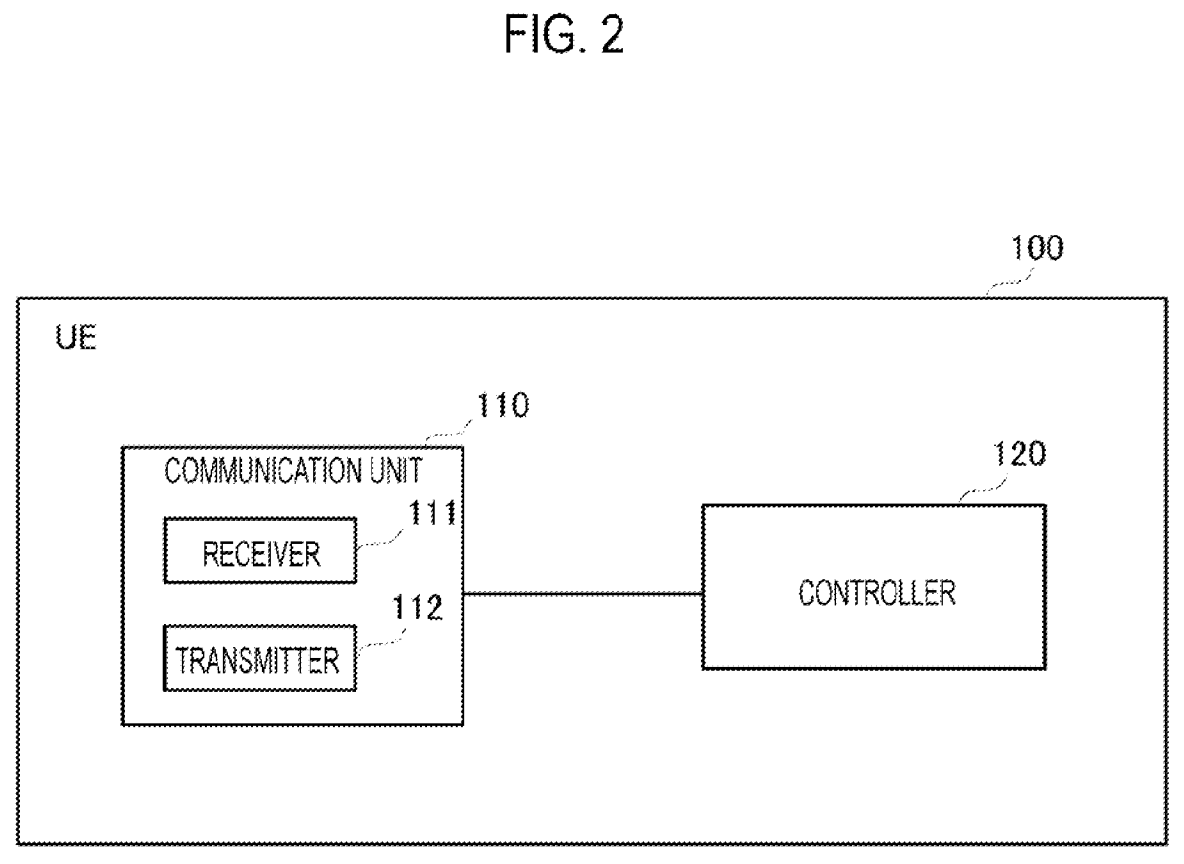

Next, a configuration of the UE 100 according to the present embodiment will be described with reference to FIG. 2. The UE 100 includes a communicator 110 and a controller 120.

The communicator 110 performs radio communication with the base station 200 by transmitting and receiving a radio signal to and from the base station 200. The communicator 110 includes at least one receiver 111 and at least one transmitter 112. The receiver 111 and the transmitter 112 may include an antenna and an RF circuit. The antenna converts a signal into a radio wave and emits the radio wave into space. Furthermore, the antenna receives a radio wave in space and converts the radio wave into a signal. The RF circuit performs analog processing of a signal transmitted and received via the antenna. The RF circuit may include a high frequency filter, an amplifier, a modulator, a low pass filter, and the like.

When the UE 100 is the general UE 100A, the number of receivers 111 included in the communicator 110 may be two to four. When the UE 100 is the specific UE 100B, the number of receivers 111 included in the communicator 110 may be one or two.

The controller 120 performs various types of control in the UE 100. The controller 120 controls communication with the base station 200 via the communicator 110. An operation of the UE 100 to be described later may be an operation under the control of the controller 120. The controller 120 may include at least one processor capable of executing a program and a memory that stores the program. The processor may execute the program to perform the operation of the controller 120. The controller 120 may include a digital signal processor that performs digital processing of signals transmitted and received via the antenna and the radio frequency (RF) circuit. The digital processing includes processing of the protocol stack of the RAN. The memory stores the program executed by a processor, a parameter related to the program, and data related to the program. The memory may include at least one of a read only memory (ROM), an erasable programmable read only memory (EPROM), an electrically erasable programmable read only memory (EEPROM), a random access memory (RAM), and a flash memory. All or part of the memory may be included in the processor.

In the UE 100 configured as described above, when the own UE exists in a cell of the base station 200, the communicator 110 receives system information broadcasted from the base station 200 in the cell. The controller 120 performs cell reselection using a neighboring cell different from the cell as a candidate based on the system information. The system information includes a second neighboring cell list different from a first neighboring cell list for the general UE 100A as a neighboring cell list indicating a neighboring cell to be excluded from a cell reselection candidate or a neighboring cell to be selected as a cell reselection candidate. The second neighboring cell list is a neighboring cell list for the specific UE 100B. Accordingly, when its own UE is the specific UE 100B, the UE 100 can control the cell reselection based on the second neighboring cell list for the specific UE 100B. Therefore, the specific UE 100B can determine, without acquiring and decoding the system information (SIB1) from a neighboring cell, whether the neighboring cell can be made a cell reselection candidate based on the second neighboring cell list. Therefore, the UE 100 can perform efficient cell reselection.

(Configuration of Base Station)

Figure 3:
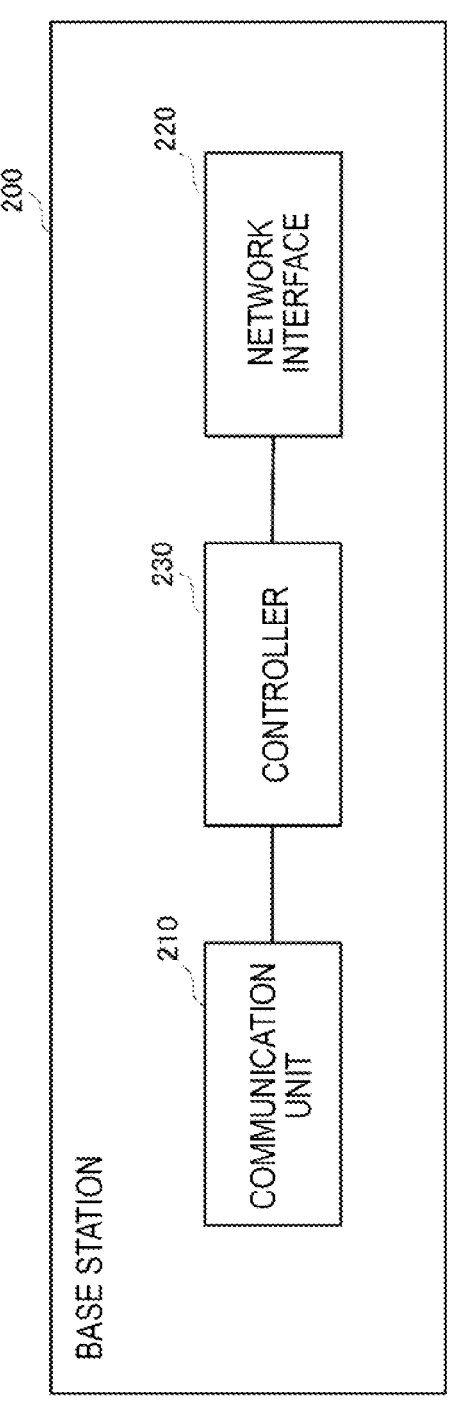
FIG. 3 is a diagram illustrating a configuration of a base station according to the embodiment.

Next, a configuration of the base station 200 according to the present embodiment will be described with reference to FIG. 3. The base station 200 includes a communicator 210, a network interface 220, and a controller 230.

For example, the communicator 210 receives a radio signal from the UE 100 and transmits a radio signal to the UE 100. The communicator 210 may include one or more receivers that receive radio signals and one or more transmitters that transmit radio signals.

The network interface 220 transmits and receives a signal to and from the network. The network interface 220 receives, for example, a signal from a neighboring base station connected via an Xn interface, which is an interface between bases stations, and transmits the signal to the neighboring base station. In addition, the network interface 220 receives, for example, a signal from the core network apparatus 300 connected via the NG interface, and transmits the signal to the core network apparatus 300.

The controller 230 performs various types of control in the base station 200. The controller 230 controls, for example, communication with the UE 100 via the communicator 210. Furthermore, the controller 230 controls, for example, communication with a node (for example, a neighboring base station and the core network apparatus 300) via the network interface 220. The operation of the base station 200 described later may be an operation under the control of the controller 230.

The controller 230 may include at least one processor capable of executing a program and a memory that stores the program. The processor may execute the program to perform the operation of the controller 230. The controller 230 may include a digital signal processor that performs digital processing of a signal transmitted and received via an antenna and an RF circuit. The digital processing includes processing of the protocol stack of the RAN. The memory stores the program executed by a processor, a parameter related to the program, and data related to the program. All or part of the memory may be included in the processor.

In the base station 200 configured as described above, the communicator 210 broadcasts, in a cell, system information used for the UE 100 existing in the cell of an own base station to perform cell reselection using a neighboring cell different from the cell as a candidate. Specifically, the communicator 210 broadcasts system information including a second neighboring cell list different from a first neighboring cell list for the general UE 100A as a neighboring cell list indicating a neighboring cell to be excluded from a cell reselection candidate or a neighboring cell to be selected as a cell reselection candidate. The second neighboring cell list is a neighboring cell list for the specific UE 100B.

Configuration Example of Protocol Stack

Figure 4:
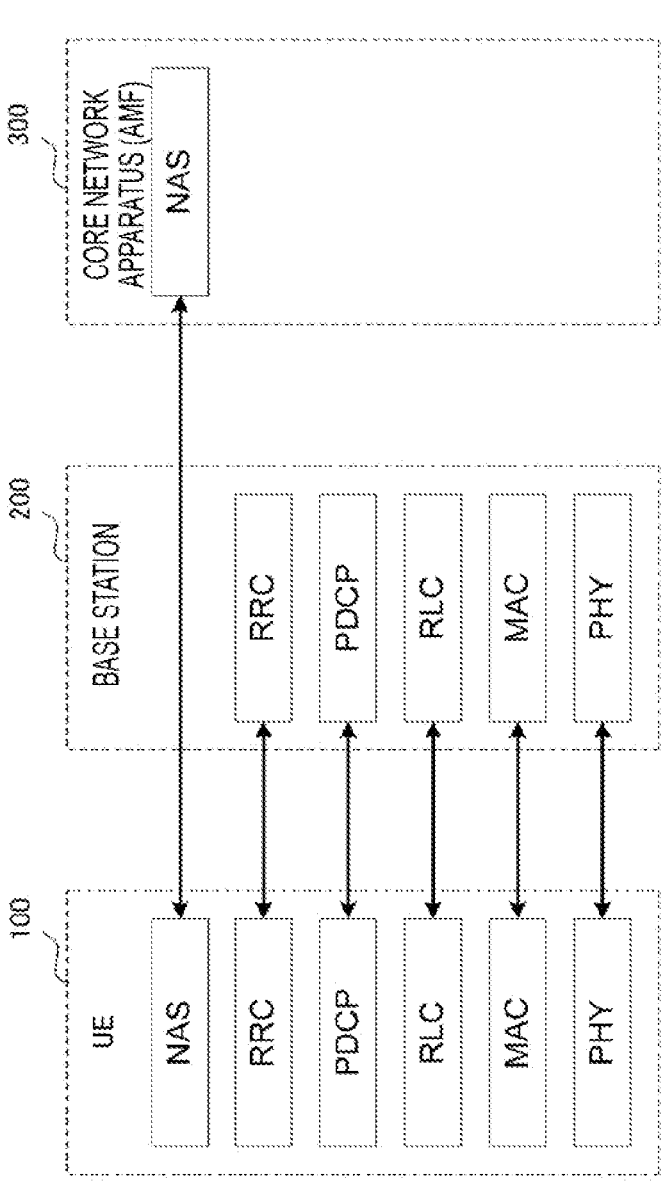
FIG. 4 is a diagram illustrating a configuration example of a protocol stack according to the embodiment.

Next, a configuration example of the protocol stack according to the present embodiment will be described with reference to FIG. 4.

A protocol of a radio section between the UE 100 and the base station 200 includes a physical (PHY) layer, a medium access control (MAC) layer, a radio link control (RLC) layer, a packet data convergence protocol (PDCP) layer, and a radio resource control (RRC) layer.

The PHY layer performs encoding/decoding, modulation/demodulation, antenna mapping/demapping, and resource mapping/demapping. Data and control information are transmitted between the PHY layer of the UE 100 and the PHY layer of the base station 200 via a physical channel.

The MAC layer performs priority control of data, a retransmission process by hybrid automatic repeat request (HARQ), a random access procedure, and the like. Data and control information are transmitted between the MAC layer of the UE 100 and the MAC layer of the base station 210 via a transport channel. The MAC layer of the base station 200 includes a scheduler. The scheduler determines uplink and downlink transport formats (transport block size, modulation and coding scheme (MCS)) and allocated resources to the UE 100.

The RLC layer transmits data to the RLC layer on the reception side using the functions of the MAC layer and the PHY layer. Data and control information are transmitted between the RLC layer of the UE 100 and the RLC layer of the base station 200 via a logical channel.

The PDCP layer performs header compression/decompression and encryption/decryption.

A service data adaptation protocol (SDAP) layer may be provided as an upper layer of the PDCP layer. The service data adaptation protocol (SDAP) layer performs mapping between an IP flow that is a unit in which a core network performs quality of service (QoS) control and a radio bearer that is a unit in which an access stratum (AS) performs QoS control.

The RRC layer controls a logical channel, a transport channel, and a physical channel according to establishment, re-establishment, and release of a radio bearer. RRC signaling for various configurations is transmitted between the RRC layer of the UE 100 and the RRC layer of the base station 200. When there is an RRC connection between the RRC of the UE 100 and the RRC of the base station 210, the UE 100 is in an RRC connected state. When there is no RRC connection between the RRC of the UE 100 and the RRC of the base station 200, the UE 100 is in an RRC idle state. When the RRC connection between the RRC of the UE 100 and the RRC of the base station 200 is suspended, the UE 100 is in an RRC inactive state.

A non-access stratum (NAS) layer located above the RRC layer performs session management and mobility management of the UE 100. NAS signaling is transmitted between the NAS layer of the UE 100 and the NAS layer of a mobility management apparatus 221.

Note that the UE 100 has an application layer and the like in addition to the protocol of the radio interface.

(Overview of Cell Selection and Cell Reselection by UE)

Next, an overview of cell selection and cell reselection by the UE 100 will be described. The UE 100 can perform cell selection or cell reselection as a selection operation of selecting a camp-on-cell. For example, the UE 100 can perform the selection operation in any of the following cases.

A case in which a new public land mobile network (PLMN) or a new stand-alone non-public network (SNPN) is selected A case in which a universal subscriber identity module (USIM) is inserted into the UE 100 or when a SNPN subscription is added A case in which a suitable cell is not found A case in which the RRC connected state transitions to the RRC idle state or RRC inactive state (A) Cell Selection In cell selection, for example, the UE 100 searches for a frequency band to identify, for each frequency, the strongest cell (for example, a cell having the highest detection level of a cell-defining SS/PBCH block (CD-SSB), a cell having the highest received power (RSRP) of the CD-SSB, or a cell having the highest reception quality (RSRQ) of the CD- SSB). Next, the UE 100 identifies a suitable cell from among the strongest cells. If the UE 100 cannot identify the suitable cell (that is, cannot find the suitable cell), the UE 100 identifies an acceptable cell. If the UE 100 can identify the suitable cell (that is, can find the suitable cell), the UE 100 selects the suitable cell as a camp-on-cell. If the UE 100 can identify only the acceptable cell (that is, can find the acceptable cell), the UE 100 selects the acceptable cell as the camp-on-cell.

The suitable cell is a cell in which the measured communication quality of the cell satisfies a cell selection criterion. The PLMN of the suitable cell is a selected PLMN, registered PLMN, or a PLMN equivalent to these PLMNs. The suitable cell is not a prohibited or reserved cell and is not part of a tracking area included in a list of "prohibited tracking areas for roaming". The acceptable cell is a cell in which the measured communication quality of the cell satisfies the cell selection criterion, and is not the prohibited cell.

For example, the cell selection criteria are Srxlev>0 and Squal>0. Srxlev represents cell selection received power. Srxlev is calculated by $Srxlev=Q_{rxlevmeas}-(Q_{rxlevmin}+Q_{rxlevminoffset})-P_{compensation}-Qoffset_{temp}$. $Q_{rxlevmeas}$ is the measured received power (reference signal received power (RSRP)) of a cell. $Q_{rxlevmin}$ is the minimum required received power. $Q_{rxlevminoffset}$ is a predetermined offset that is constantly applied. $P_{compensation}$ is a parameter related to an uplink capability. $Qoffset_{temp}$ is an offset that is temporarily applied. Squal represents a cell selection quality level. Squal is calculated by $Squal=Q_{qualmeas}-(Q_{qualmin}+Q_{qualminoffset})-Qoffset_{temp}$. $Q_{qualmeas}$ is the measured cell quality level (reference signal received quality (RSRQ)). $Q_{qualmin}$ is the minimum required quality level. $Q_{qualminoffset}$ is a predetermined offset that is constantly applied. $Qoffset_{temp}$ is an offset that is temporarily applied.

(B) Cell Reselection

In the cell reselection, the UE 100 in the RRC idle state or the RRC inactive state measures the communication quality of a serving cell and a neighboring cell. The UE 100 selects a camp-on-cell to be used as the serving cell, for example, based on the following criteria. The UE 100 determines the priority of the cell to be selected according to the priority of frequencies. The UE 100 may select the camp-on-cell based on the following criteria when 1 second or more passes after camping on the current serving cell.

(B1) The priority of the frequency of the neighboring cell is higher than the priority of the frequency of the current serving cell:

The UE 100 selects a cell that satisfies the relationship of $Squal>Thresh_{X,HighQ}$ over a predetermined duration (for example, $Treselection_{RAT}$) or a cell that satisfies the relationship of $Srxlev>Thresh_{X,HighP}$ over a predetermined duration. Each of $Thresh_{X,HighP}$ and $Thresh_{X,HighQ}$ is a predetermined threshold value.

(B2) The priority of the frequency of the neighboring cell is the same as the priority of the frequency of the current serving cell:

The UE 100 calculates a ranking Rs of the current serving cell and a ranking Rn of the neighboring cell. The UE 100 selects a cell having a ranking Rn higher than Rs over a predetermined duration as the camp-on-cell.

For example, Rs is calculated by $Rs=Q_{meas,s}+Q_{hyst}-Qoffset_{temp}$. Rn is calculated by $Rn=Q_{meas,n}-Qoffset-Qoffset_{temp}$. $Q_{meas,s}$ is received power (RSRP) of the current serving cell. $Q_{meas,n}$ is received power (RSRP) of the neighboring cell. $Q_{hyst}$ is a hysteresis value used to facilitate the reselection of the current serving cell. $Qoffset_{temp}$ is an offset that is temporarily applied.

(B3) The priority of the frequency of the neighboring cell is lower than the priority of the frequency of the current serving cell:

For example, it is assumed that the serving cell satisfies the relationship of $Squal<Thresh_{Serving,LowQ}$ or $Srxlev<Thresh_{Serving,LowP}$ over a predetermined duration. Under this assumption, the UE 100 selects, for example, a cell satisfying the relationship of $Squal>Thresh_{X,LowQ}$ over a predetermined duration or a cell satisfying the relationship of $Srxlev>Thresh_{X,LowP}$ over a predetermined duration. Each of $Thresh_{X,LowP}$ and $Thresh_{X,LowQ}$ is a predetermined threshold value.

Various parameters used for cell selection are included in system information (system information block (SIB)) broadcasted from the base station 200. The various parameters include, for example, the priority of the frequency (for example, cellReselectionPriority, cellReselectionSubPriority), a predetermined duration ($Treselection_{RAT}$), various offsets ($Q_{qualminoffset}$, $Q_{rxlevminoffset}$, $Q_{offsettemp}$, $Q_{hyst}$, $Q_{offset}$), and/or various threshold values ($Thresh_{X,HighQ}$, $Thresh_{X,HighP}$, $Threshs_{Serving,LowQ}$, $Thresh_{Serving,LowP}$, $Thresh_{X,LowP}$, $Thresh_{X,LowQ}$). The cellReselectionPriority indicates the priority of the frequency in eight stages, and the cellReselectionSubPriority indicates the sub-priority of the frequency in four stages. As a result, the base station 200 can configure a maximum of 32 priority levels for the frequency in the UE 100. The priority of the frequency may be sent to the UE 100 as an RRC release message.

(System Operation)

Next, an operation of the mobile communication system 1 according to the present embodiment will be described.

(1) Example of Operation Environment

An example of an operation environment of the mobile communication system 1 according to the present embodiment will be described with reference to FIG. 5.

Figure 5:
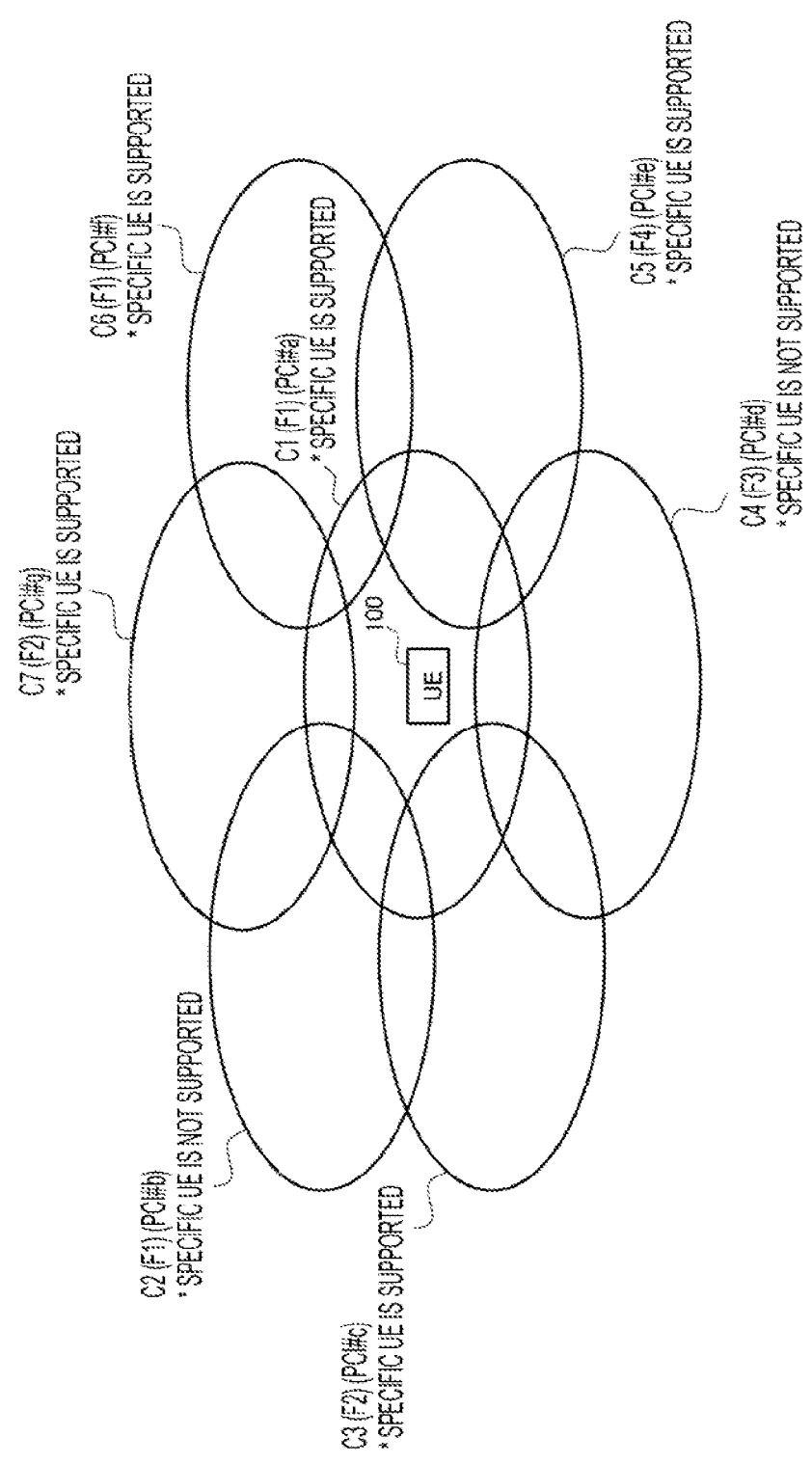
FIG. 5 is a diagram illustrating an example of an operation environment of the mobile communication system according to the embodiment.

In FIG. 5, cells C1 to C7 are illustrated as cells of the mobile communication system 1. The cell C1 is a cell belonging to a frequency F1, and a physical cell identifier (PCI) thereof is PCI #a. The cell C1 supports the specific UE 100B. The cell C2 is a cell belonging to the frequency F1, and the PCI thereof is PCI #b. The cell C2 does not support the specific UE 100B. The cell C3 is a cell belonging to a frequency F2, and the PCI thereof is PCI #c. The cell C3 supports the specific UE 100B. The cell C4 is a cell belonging to a frequency F3, and the PCI thereof is PCI #d. The cell C4 does not support the specific UE 100B. The cell C5 is a cell belonging to a frequency F4, and the PCI thereof is PCI #e. The cell C5 supports the specific UE 100B. The cell C6 is a cell belonging to the frequency F 1, the PCI thereof is PCI #f. The cell C6 supports the specific UE 100B. The cell C7 is a cell belonging to the frequency F2, and the PCI thereof is PCI #g. The cell C7 supports the specific UE 100B. It is noted that the UE 100 receives a synchronization signal and/or a reference signal transmitted from each cell, for example, a synchronization signal (SS)/PBCH block (SSB). As a result, the UE 100 can detect the cell and recognize the PCI of the cell.

As described above, in the mobile communication system 1, cells having various frequencies may be mixed, and the cells supporting the specific UE 100B and the cells not supporting the specific UE 100B may be mixed. It is noted that each cell may be managed by a different base station 200.

FIG. 5 illustrates an example in which the UE 100 in the RRC idle state or the RRC inactive state selects the cell C1 as a camp-on-cell. When the cell C1 is used as a reference, the cells C2 to C7 correspond to neighboring cells. Further, when the cell C1 is used as a reference, the cells C2 and C6 correspond to intra-frequency neighboring cells, and the other cells correspond to inter-frequency neighboring cells.

Here, it is assumed that the UE 100 is the specific UE 100B. The UE 100 in the RRC idle state or the RRC inactive state periodically monitors paging from the base station 200 that manages the cell C1. Here, for example, the UE 100 changes the camp-on-cell of its own UE from the cell C1 to a neighboring cell by performing cell reselection along with the movement of its own UE. However, since the cell C2 and the cell C4 among the neighboring cells do not support the specific UE 100B, the specific UE 100B cannot camp on the cell C2 and the cell C4.

In the present embodiment, the base station 200 that manages the cell C1 broadcasts, in the cell C1, system information used to allow the UE 100 existing in the cell C1 to perform cell reselection using a neighboring cell different from the cell C1 as a candidate. Specifically, the base station 200 that manages the cell C1 broadcasts system information including a second neighboring cell list different from a first neighboring cell list for the general UE 100A as a neighboring cell list indicating a neighboring cell to be excluded from a cell reselection candidate or a neighboring cell to be selected as a cell reselection candidate. The second neighboring cell list is a neighboring cell list for the specific UE 100B. As a result, the specific UE 100B existing in the cell C1 can determine whether a neighboring cell can be set as a cell reselection candidate based on the second neighboring cell list without acquiring and decoding the system information (SIB1) from the corresponding neighboring cell. Therefore, the specific UE 100B existing in the cell C1 can perform efficient cell reselection.

(2) Example of Operation Flow

Figure 6:
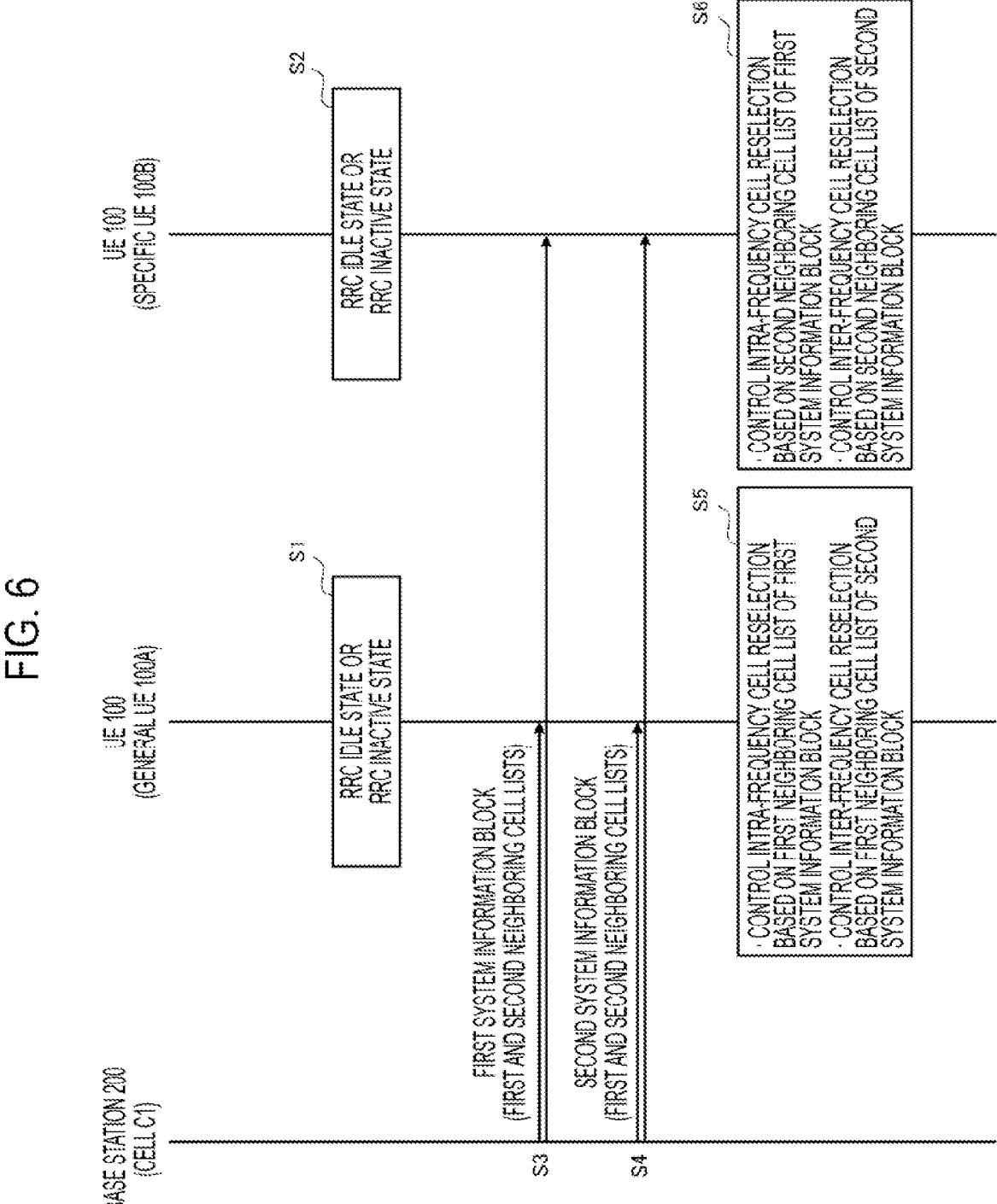
FIG. 6 is a diagram illustrating an example of an operation flow of the mobile communication system according to the embodiment.

An example of an operation flow of the mobile communication system 1 according to the present embodiment will be described with reference to FIG. 6. Here, it is assumed that the general UE 100A and the specific UE 100B exist in the cell C1.

In step S1, the general UE 100A is in the RRC idle state or the RRC inactive state in the cell C1.

In step S2, the specific UE 100B is in the RRC idle state or the RRC inactive state in the cell C1.

In steps S3 and S4, the base station 200 (the communicator 210) broadcasts system information in the cell C1. The system information is used to allow the UE 100 (the general UE 100A and the specific UE 100B) existing in the cell C1 to perform cell reselection using a neighboring cell different from the cell C1 as a candidate. Each of the general UE 100A (the communicator 110) and the specific UE 100B (the communicator 110) receives the system information.

The base station 200 (the communicator 210) broadcasts the system information by transmitting the system information using a broadcast channel. The system information is information capable of being received (acquired) even by the UE 100 in the RRC idle state or the RRC inactive state. The base station 200 (the communicator 210) may periodically broadcast such system information.

Specifically, in step S3, the base station 200 (the communicator 210) broadcasts a first system information block for cell reselection with respect to an intra-frequency neighboring cell(s), which is a neighboring cell(s) belonging to the same frequency as the frequency of the cell C1. For example, the first system information block is a system information block type 3 (SIB3). The SIB3 includes neighboring cell related information for intra-frequency cell reselection.

In step S4, the base station 200 (the communicator 210) broadcasts a second system information block for cell reselection with respect to an inter-frequency neighboring cell(s), which is a neighboring cell(s) belonging to a frequency different from the frequency of the cell C1. For example, the second system information block is a system information block type 4 (SIB4). The SIB4 includes information relevant for inter-frequency cell reselection (that is, information on neighboring NR frequencies and inter-frequency neighboring cells relevant for cell reselection). It is noted that the order of steps S3 and S4 may be reversed, or steps S3 and S4 may be performed simultaneously.

In step S5, the general UE 100A (the controller 120) controls the cell reselection based on a first neighboring cell list included in the system information received from the gNB 200 (the cell C1). Specifically, the general UE 100A (the controller 120) performs intra-frequency cell reselection control based on the first neighboring cell list included in the first system information block and inter-frequency cell reselection control based on the first neighboring cell list included in the second system information block.

In step S6, the specific UE 100B (the controller 120) controls the cell reselection based on a second neighboring cell list included in the system information received from the gNB 200 (the cell C1). Specifically, the specific UE 100B (the controller 120) performs intra-frequency cell reselection control based on the second neighboring cell list included in the first system information block and inter-frequency cell reselection control based on the first neighboring cell list included in the second system information block.

As described above, when its own UE is the specific UE 100B, the controller 120 of the UE 100 controls the cell reselection based on the second neighboring cell list included in the system information. As a result, the specific UE 100B (the controller 120) can use the second neighboring cell list optimized for the specific UE 100B. Therefore, the specific UE 100B (the controller 120) can appropriately determine, based on the second neighboring cell list, a neighboring cell to be excluded from a cell reselection candidate or a neighboring cell to be selected as a cell reselection candidate.

Specifically, the specific UE 100B (the controller 120) controls the cell reselection based on the second neighboring cell list included in each of the first system information block and the second system information block. As a result, the specific UE 100B (the controller 120) can appropriately determine, based on the second neighboring cell list included in the first system information block, a neighboring cell(s) to be excluded from a candidate for intra-cell reselection or a neighboring cell(s) to be selected as a candidate for intra-frequency cell reselection. In addition, the specific UE 100B (the controller 120) can appropriately determine, based on the second neighboring cell list included in the second system information block, a neighboring cell(s) to be excluded from a candidate for inter-frequency cell reselection or a neighboring cell(s) to be selected as a candidate for inter-frequency cell reselection.

(3) Example of First System Information Block

An example of the first system information block according to the present embodiment will be described with reference to FIG. 7.

As described above, the first system information block is a system information block for intra-frequency cell reselection with respect to an intra-frequency neighboring cell(s), and is, for example, the SIB3.

The SIB3 includes the first neighboring cell list indicating a neighboring cell(s) to be excluded, by the general UE 100A, from a candidate for intra-frequency cell reselection or a neighboring cell(s) to be selected, by the general UE 100A, as a candidate for intra-frequency cell reselection. The first neighboring cell list includes at least one of "IntraFreqBlackCellList" illustrated in A1 of FIG. 7 and "IntraFreqWhiteCellList-r16" illustrated in A2 of FIG. 7. The "IntraFreqBlackCellList" is an information element indicating a neighboring cell(s) to be excluded, by the general UE 100A, from a candidate for intra-frequency cell reselection by one or a plurality of PCI ranges (SEQUENCE (SIZE (1 . . . maxCellBlack)) OF PCI-Range) (refer to A4 in FIG. 7). "IntraFreqWhiteCellList-r16" is an information element indicating a neighboring cell(s) to be selected, by the general UE 100A, as a candidate for intra-frequency cell reselection by one or a plurality of PCI ranges (SEQUENCE (SIZE (1 . . . maxCellWhite)) OF PCI-Range) (refer to A4 in FIG. 7).

In addition, the SIB3 includes the second neighboring cell list indicating a neighboring cell(s) to be excluded, by the specific UE 100B, from a candidate for intra-frequency cell reselection or a neighboring cell(s) to be selected, by the specific UE 100B, as a candidate for intra-frequency cell reselection.

As illustrated in A3 in FIG. 7, the second neighboring cell list included in the SIB3 may be at least one of the following (a1) to (a3).

(a1) "IntraFreqExcludedCellListRedCap-r17" which is a first excluded cell list indicating an intra-frequency neighboring cell(s) to be excluded, by the specific UE 100B, from a candidate (a2) "IntraFreqExcludedCellListSingleRx-r17" which is a second excluded cell list indicating an intra-frequency neighboring cell(s) to be excluded, by the UE 100 (the specific UE 100B) equipped with only one receiver 111, from a candidate (a3) "IntraFreqExcludedCellListDualRx-r17" which is a third excluded cell list indicating an intra-frequency neighboring cell(s) to be excluded, by the UE 100 (the specific UE 100B) equipped with only two receivers 111, from a candidate Each of "IntraFreqExcludedCellListRedCap-r17", "IntraFreqExcludedCellListSingleRx-r17", and "IntraFreqExcludedCellListDualRx-r17" is an information element indicating a neighboring cell(s) to be excluded from a candidate for intra-frequency cell reselection by one or a plurality of PCI ranges (SEQUENCE (SIZE (1 . . . maxCellBlack)) OF PCI-Range) (refer to A5 in FIG. 7). As a result, the specific UE 100B (the controller 120) can appropriately determine a neighboring cell(s) to be excluded from a candidate in intra-frequency cell reselection based on at least one of "IntraFreqExcludedCellListRedCap-r17", "IntraFreqExcludedCellListSingleRx-r17", and "IntraFreqExcludedCellListDualRx-r17".

As illustrated in A3 of FIG. 7, the second neighboring cell list included in the SIB3 may be at least one of the following (b1) to (b3).

(b1) "IntraFreqAllowedCellListRedCap-r17" which is a first allowed cell list indicating an intra-frequency neighboring cell(s) to be selected, by the specific UE 100B, as a candidate for intra-frequency cell reselection (b2) "IntraFreqAllowedCellListSingleRx-r17" which is a second allowed cell list indicating an intra-frequency neighboring cell(s) to be selected, by the UE 100 (the specific UE 100B) equipped with only one receiver 111, as a candidate for intra-frequency cell reselection (b3) "IntraFreqWAllowedCellListDualRx-r17" which is a third allowed cell list indicating an intra-frequency neighboring cell(s) to be selected, by the UE 100 (the specific UE 100B) equipped with only two receivers 111, as a candidate for intra-frequency cell reselection Each of "IntraFreqAllowedCellListRedCap-r17", "IntraFreqAllowedCellListSingleRx-r17", and "IntraFreqWAllowedCellListDualRx-r17" is an information element indicating a neighboring cell(s) to be selected as a candidate for intra-frequency cell reselection by one or a plurality of PCI ranges (SEQUENCE (SIZE (1 . . . max-CellWhite)) OF PCI-Range) (refer to A5 in FIG. 7). As a result, the specific UE 100B (the controller 120) can appropriately determine a neighboring cell(s) to be selected as a candidate in intra-frequency cell reselection based on at least one of "IntraFreqAllowedCellListRedCap-r17", "IntraFreqAllowedCellListSingleRx-r17", and "IntraFreqWAllowedCellListDualRx-r17".

(4) Example of Second System Information Block

An example of the second system information block according to the present embodiment will be described with reference to FIG. 8.

As described above, the second system information block is a system information block for inter-frequency cell reselection with respect to an inter-frequency neighboring cell(s), and is, for example, the SIB4.

The SIB4 includes the first neighboring cell list indicating a neighboring cell(s) to be excluded, by the general UE 100A, from a candidate for inter-frequency cell reselection or a neighboring cell(s) to be selected, by the general UE 100A, as a candidate for inter-frequency cell reselection. The first neighboring cell list includes at least one of "InterFreqBlackCellList" illustrated in B1 of FIG. 8 and "InterFreqWhiteCellList-r16" illustrated in B2 of FIG. 8. The "InterFreqBlackCellList" is an information element indicating a neighboring cell(s) to be excluded, by the general UE 100A, from a candidate for inter-frequency cell reselection by one or a plurality of PCI ranges (SEQUENCE (SIZE (1 . . . maxCellBlack)) OF PCI-Range) (refer to B4 in FIG. 8). "InterFreqWhiteCellList-r16" is an information element indicating a neighboring cell(s) to be selected by the general UE 100A as a candidate for inter-frequency cell reselection by one or a plurality of PCI ranges (SEQUENCE (SIZE (1 . . . maxCellWhite)) OF PCI-Range) (refer to B4 in FIG. 8).

In addition, the SIB4 includes the second neighboring cell list indicating a neighboring cell(s) to be excluded by the specific UE 100B from a candidate for inter-frequency cell reselection or a neighboring cell(s) to be selected by the specific UE 100B as a candidate for inter-frequency cell reselection.

Figure 8:
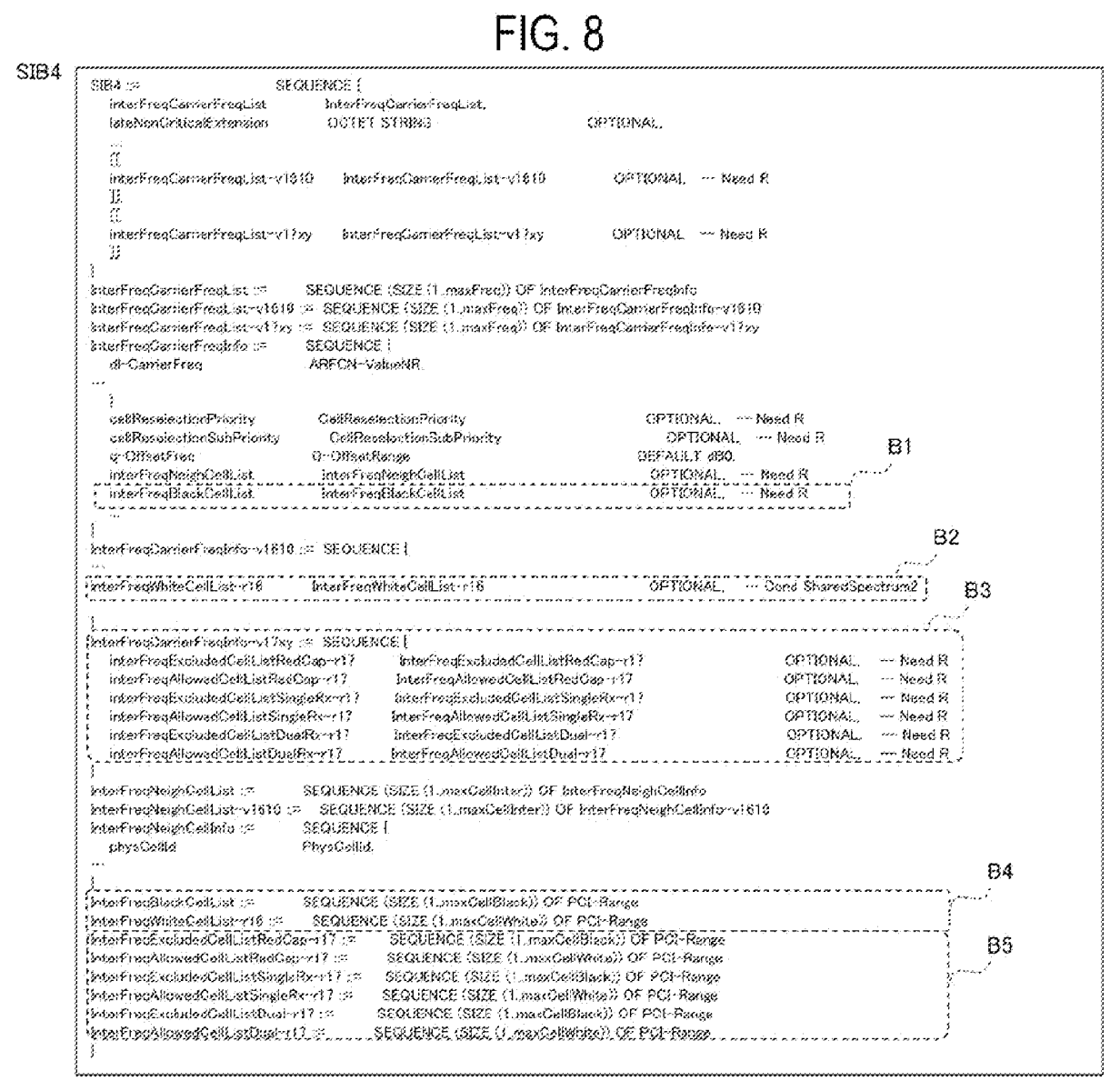

As illustrated in B3 of FIG. 8, the second neighboring cell list included in the SIB4 may be at least one of the following (c1) to (c3).

(c1) "InterFreqExcludedCellListRedCap-r17" which is a first excluded cell list indicating an inter-frequency neighboring cell(s) to be excluded, by the specific UE 100B, from a candidate (c2) "InterFreqExcludedCellListSingleRx-r17" which is a second excluded cell list indicating an inter-frequency neighboring cell(s) to be excluded, by the UE 100 (the specific UE 100B) equipped with only one receiver 111, from a candidate (c3) "InterFreqExcludedCellListDualRx-r17" which is a third excluded cell list indicating an inter-frequency neighboring cell(s) to be excluded, by the UE 100 (the specific UE 100B) equipped with only two receivers 111, from a candidate Each of "InterFreqExcludedCellListRedCap-r17", "InterFreqExcludedCellListSingleRx-r17", and "InterFreqExcludedCellListDualRx-r17" is an information element indicating a neighboring cell(s) to be excluded from a candidate for inter-frequency cell reselection by one or a plurality of PCI ranges (SEQUENCE (SIZE (1 . . . maxCellBlack)) OF PCI-Range) (refer to B5 in FIG. 8). As a result, the specific UE 100B (the controller 120) can appropriately determine a neighboring cell(s) to be excluded from a candidate in inter-frequency cell reselection based on at least one of "InterFreqExcludedCellLi stRedCap-r17", "InterFreqExcludedCellListSingleRx-r17", and "InterFreqExcludedCellListDualRx-r17".

As illustrated in B3 of FIG. 8, the second neighboring cell list included in the SIB4 may be at least one of the following (d1) to (d3).

(d1) "InterFreqAllowedCellListRedCap-r17" which is a first allowed cell list indicating an inter-frequency neighboring cell(s) to be selected, by the specific UE 100B, as a candidate for inter-frequency cell reselection (d2) "InterFreqAllowedCellListSingleRx-r17" which is a second allowed cell list indicating an inter-frequency neighboring cell(s) to be selected, by the UE 100 (the specific UE 100B) equipped with only one receiver 111, as a candidate for inter-frequency cell reselection (d3) "InterFreqWAllowedCellListDualRx-r17" which is a third allowed cell list indicating an inter-frequency neighboring cell(s) to be selected, by the UE 100 (the specific UE 100B) equipped with only two receivers 111, as a candidate for inter-frequency cell reselection Each of "InterFreqAllowedCellListRedCap-r17", "InterFreqAllowedCellListSingleRx-r17", and "InterFreqWAllowedCellListDualRx-r17" is an information element indicating a neighboring cell(s) to be selected as a candidate for inter-frequency cell reselection by one or a plurality of PCI ranges (SEQUENCE (SIZE (1 . . . maxCellWhite)) OF PCI-Range) (refer to B5 in FIG. 8). As a result, the specific UE 100B (the controller 120) can appropriately determine a neighboring cell(s) to be selected as a candidate in inter-frequency cell reselection based on at least one of "InterFreqAllowedCellListRedCap-r17", "InterFreqAllowedCellListSingleRx-r17", and "InterFreqWAllowedCellListDualRx-r17".

Other Embodiments

In the above-described embodiments, a description has been given as to an example in which each of the first system information block and the second system information block includes the second neighboring cell list. However, the second neighboring cell list may be included in only one of the first system information block and the second system information block. In addition, although a description has been given as to an example of controlling the cell reselection of the specific UE 100B by the second neighboring cell list, the cell selection of the specific UE 100B may be further controlled by the second neighboring cell list.

In the embodiments, the base station 200 may include a plurality of units. The plurality of units may include a first unit that hosts a higher layer included in the protocol stack and a second unit that hosts a lower layer included in the protocol stack. The higher layer may include an RRC layer, an SDAP layer, and a PDCP layer, and the lower layer may include an RLC layer, a MAC layer, and a PHY layer. The first unit may be a central unit (CU), and the second unit may be a distributed unit (DU). The plurality of units may include a third unit that performs processing of a lower layer of the PHY layer. The second unit may perform processing of a higher layer of the PHY layer. The third unit may be a radio unit (RU). The base station 200 may be one of the plurality of units, and may be connected to another unit of the plurality of units. In addition, the base station 200 may be an integrated access and backhaul (IAB) donor or an IAB node.

In the above-described embodiments, the mobile communication system based on NR has been described as an example of the mobile communication system 1. However, the mobile communication system 1 is not limited to this example. The mobile communication system 1 may be a system conforming to TS of any of LTE or another generation system (for example, the sixth generation) of the 3GPP standard. The base station 200 may be an eNB that provides an evolved universal terrestrial radio access (E-UTRA) user plane and a control plane protocol termination towards the UE 100 in LTE. The mobile communication system 1 may be a system conforming to TS having a standard other than the 3GPP standard.

The steps in the operations of the above-described embodiments may not necessarily be performed in chronological order according to the order described in the flow diagram or sequence diagram. For example, steps in an operation may be performed in an order different from the order described as a flow diagram or sequence diagram, or may be performed in parallel. In addition, some of the steps in the operation may be removed and additional steps may be added to the process. Furthermore, each operation flow described above is not limited to be separately and independently implemented, and can be implemented by combining two or more operation flows. For example, some steps of one operation flow may be added to another operation flow, or some steps of one operation flow may be replaced with some steps of another operation flow.

A program may be provided to cause a computer to execute the operations of the UE 100 or the base station 200. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM and a DVD-ROM. The UE 100 or the base station 200 may be embodied as a semiconductor integrated circuit (chipset, SoC, etc.) by integrating the circuits that execute the respective operations of the UE 100 or the base station 200.

In the above-described embodiments, "transmit" may mean to perform processing of at least one layer in a protocol stack used for transmission, or may mean to physically transmit a signal wirelessly or by wire. Alternatively, "transmit" may mean a combination of performing the processing of at least one layer and physically transmitting a signal wirelessly or by wire. Similarly, "receive" may mean to perform processing of at least one layer in the protocol stack used for reception, or may mean to physically receive a signal wirelessly or by wire. Alternatively, "receive" may mean a combination of performing the processing of at least one layer and physically receiving a signal wirelessly or by wire.

Although the present disclosure has been described in accordance with examples, it is understood that the present disclosure is not limited to the examples and structures. The present disclosure also includes various modification examples and modifications within an equivalent range. In addition, various combinations and modes, and other combinations and modes including only one element, more elements, or less elements are also within the scope and idea of the present disclosure.

The invention claimed is:

1. A communication device comprising:
   a communicator configured to receive, from a base station, system information including information relevant for inter-frequency cell reselection, information indicating a duration for the inter-frequency cell reselection, and information indicating a threshold for a received power; and
   a controller configured to perform the inter-frequency cell reselection based on first information and second information included in the system information, the first information indicating a priority of a carrier frequency used for the inter-frequency cell reselection, the second information indicating that a Reduced Capability user equipment is allowed to access, wherein
   the controller is configured to measure the received power based on CD-SSB (cell-defining SS/PBCH Block) of a cell belonging to the carrier frequency and select, as a suitable cell, the cell belonging to the carrier frequency with the priority higher than a priority of a carrier frequency to which a serving cell belongs, the cell fulfilling a criterion of the received power based on the threshold during the duration.

2. The communication device according to claim 1, wherein
   the communication device is a Reduced Capability user equipment.

3. The base station comprising:
   a communicator configured to transmit, to a communication device, system information relevant for inter-frequency cell reselection, information indicating a duration for the inter-frequency cell reselection, and information indicating a threshold for a received power; and
   a controller configured to control for the communication device to perform the inter-frequency cell reselection based on first information and second information included in the system information, the first information indicating a priority of a carrier frequency used for the inter-frequency cell reselection, the second information indicating that a Reduced Capability user equipment is allowed to access, wherein
   the controller is configured to control for the communication device to measure the received power based on CD-SSB (cell-defining SS/PBCH Block) of a cell belonging to the carrier frequency and select, as a suitable cell, the cell belonging to the carrier frequency with the priority higher than a priority of a carrier frequency to which a serving cell belongs, the cell fulfilling a criterion of the received power based on the threshold during the duration.

4. The base station according to claim 3, wherein the communication device is a Reduced Capability user equipment.

5. A communication method performed by a communication device, the communication method comprising:

receiving, from a base station, system information including information relevant for inter-frequency cell reselection, information indicating a duration for the inter-frequency cell reselection, and information indicating a threshold for a received power; and performing the inter-frequency cell reselection based on first information and second information included in the system information, the first information indicating a priority of a carrier frequency used for the inter-frequency cell reselection, the second information indicating that a Reduced Capability user equipment is allowed to access, wherein in the performing the inter-frequency cell reselection, measuring the received power based on CD-SSB (cell-defining SS/PBCH Block) of a cell belonging to the carrier frequency and selecting, as a suitable cell, the cell belonging to the carrier frequency with the priority higher than a priority of a carrier frequency to which a serving cell belongs, the cell fulfilling a criterion of the received power based on the threshold during the duration.

6. The communication method according to claim 5, wherein the communication device is a Reduced Capability user equipment.

\*　\*　\*　\*　\*

18